(12) United States Patent
Hunzinger et al.

(10) Patent No.: US 9,064,215 B2
(45) Date of Patent: Jun. 23, 2015

(54) LEARNING SPIKE TIMING PRECISION

(75) Inventors: Jason Frank Hunzinger, Escondido, CA (US); Victor Hokkiu Chan, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 13/523,574

(22) Filed: Jun. 14, 2012

(65) Prior Publication Data

US 2013/0339280 A1    Dec. 19, 2013

(51) Int. Cl.
| | |
|---|---|
| *G06F 15/18* | (2006.01) |
| *G06N 3/08* | (2006.01) |
| *G06N 3/04* | (2006.01) |

(52) U.S. Cl.
CPC .................. *G06N 3/08* (2013.01); *G06N 3/049* (2013.01); *G06N 3/088* (2013.01)

(58) Field of Classification Search
None
See application file for complete search history.

(56) References Cited

U.S. PATENT DOCUMENTS

| | | | |
|---|---|---|---|
| 5,459,817 | A | 10/1995 | Shima |
| 5,666,079 | A | 9/1997 | Ma |
| 6,505,182 | B1 | 1/2003 | Van |
| 6,581,046 | B1 | 6/2003 | Ahissar |
| 7,174,325 | B1 | 2/2007 | Ascoli |
| 7,287,014 | B2 | 10/2007 | Chen et al. |
| 7,412,428 | B2 | 8/2008 | Nugent |
| 7,430,546 | B1 | 9/2008 | Suri |
| 7,512,271 | B2 | 3/2009 | Matsugu et al. |
| 7,904,398 | B1 | 3/2011 | Repici |
| 8,433,665 | B2 | 4/2013 | Tang et al. |
| 8,606,732 | B2 | 12/2013 | Venkatraman et al. |
| 8,625,337 | B2 | 1/2014 | Wu et al. |
| 8,694,452 | B2 | 4/2014 | Aparin et al. |
| 8,706,662 | B2 | 4/2014 | Chan et al. |

(Continued)

FOREIGN PATENT DOCUMENTS

| | | |
|---|---|---|
| JP | 7084978 A | 3/1995 |
| TW | 242981 | 3/1995 |

(Continued)

OTHER PUBLICATIONS

Caporale, Natalia, and Yang Dan. "Spike timing-dependent plasticity: a Hebbian learning rule." Annu. Rev. Neurosci. 31 (2008): 25-46.*

(Continued)

*Primary Examiner* — Wilbert L Starks
*Assistant Examiner* — Daniel Pellett
(74) *Attorney, Agent, or Firm* — Rupit Patel

(57) ABSTRACT

Certain aspects of the present disclosure provide methods and apparatus for learning or determining delays between neuron models so that the uncertainty in input spike timing is accounted for in the margin of time between a delayed pre-synaptic input spike and a post-synaptic spike. In this manner, a neural network can correctly match patterns (even in the presence of significant jitter) and correctly distinguish between different noisy patterns. One example method generally includes determining an uncertainty associated with a first pre-synaptic spike time of a first neuron model for a pattern to be learned; and determining a delay based on the uncertainty, such that the delay added to a second pre-synaptic spike time of the first neuron model results in a causal margin of time between the delayed second pre-synaptic spike time and a post-synaptic spike time of a second neuron model.

60 Claims, 5 Drawing Sheets

(56) References Cited

U.S. PATENT DOCUMENTS

| | | |
|---|---|---|
| 8,756,173 B2 | 6/2014 | Hunzinger et al. |
| 2004/0097562 A1 | 5/2004 | Olesen et al. |
| 2006/0235477 A1 | 10/2006 | Rom |
| 2008/0208783 A1 | 8/2008 | Jaros et al. |
| 2009/0287624 A1 | 11/2009 | Rouat et al. |
| 2009/0313195 A1 | 12/2009 | McDaid et al. |
| 2010/0076916 A1 | 3/2010 | Van et al. |
| 2010/0145402 A1 | 6/2010 | Rom |
| 2010/0185250 A1 | 7/2010 | Rom |
| 2010/0220523 A1 | 9/2010 | Modha et al. |
| 2010/0235310 A1 | 9/2010 | Gage et al. |
| 2010/0299296 A1 | 11/2010 | Modha et al. |
| 2010/0299297 A1 | 11/2010 | Breitwisch et al. |
| 2011/0137843 A1 | 6/2011 | Poon et al. |
| 2011/0153533 A1 | 6/2011 | Jackson et al. |
| 2012/0011089 A1 | 1/2012 | Aparin et al. |
| 2012/0084241 A1 | 4/2012 | Friedman et al. |
| 2012/0109864 A1 | 5/2012 | Modha |
| 2012/0150781 A1 | 6/2012 | Arthur et al. |
| 2013/0024409 A1 | 1/2013 | Hunzinger et al. |
| 2013/0046716 A1 | 2/2013 | Chan et al. |
| 2013/0073491 A1 | 3/2013 | Izhikevich et al. |
| 2013/0073501 A1 | 3/2013 | Hunzinger et al. |
| 2013/0103626 A1 | 4/2013 | Hunzinger |
| 2013/0226851 A1 | 8/2013 | Hunzinger et al. |

FOREIGN PATENT DOCUMENTS

| | | |
|---|---|---|
| WO | 9318474 A1 | 9/1993 |
| WO | 9729437 A1 | 8/1997 |

OTHER PUBLICATIONS

Cao, Jinde, De-Shuang Huang, and Yuzhong Qu. "Global robust stability of delayed recurrent neural networks." Chaos, Solitons & Fractals 23.1 (2005): 221-229.*

Liu, Yurong, Zidong Wang, and Xiaohui Liu. "Global exponential stability of generalized recurrent neural networks with discrete and distributed delays." Neural Networks 19.5 (2006): 667-675.*

Schrauwen, Benjamin, and Jan Van Campenhout. "Extending spikeprop." Neural Networks, 2004. Proceedings. 2004 IEEE International Joint Conference on. vol. 1. IEEE, 2004.*

Wang, Zidong, et al. "Exponential stability of uncertain stochastic neural networks with mixed time-delays." Chaos, Solitons & Fractals 32.1 (2007): 62-72.*

Xu, Shengyuan, James Lam, and Daniel WC Ho. "Novel global robust stability criteria for interval neural networks with multiple time-varying delays." Physics Letters A 342.4 (2005): 322-330.*

Bishop W.B., "Estimating the posterior probability of LTP failure by sequential Bayesian analysis of an imperfect Bernoulli trial model," IEEE Transactions on Biomedical Engineering, vol. 48, No. 6, Jun. 2001, pp. 670-683, XP011007084, D0I: 10.1109/10.923785 Section III.A.1.

Friedrich J., et al., "Dynamics of recurrent neural networks with delayed unreliable synapses: metastable clustering," Journal of Computational Neur0science, vol. 27, No. 1, Dec. 10, 2008, pp. 65-80, XP019730519, D0I:10.1007/S10827-008-0127-1 Section 2.

International Search Report and Written Opinion—PCT/US2013/045928—ISAEPO—Feb. 20, 2014.

Luben0v E.B., et al., "Decoupling through synchrony in neuronal circuits with propagation delays", Neuron, vol. 58, No. 1, Apr. 9, 2008, pp. 118-131, XP055101258, D0I:10.1016/j.neuron.2008.01.036 Experimental procedures.

Morrison A., et al., "Phenomenological models of synaptic plasticity based on spike timing," Biological Cybernetics, vol. 98, No. 6, Apr. 9, 2008, pp. 459-478, XP019630139, D0I: 10.1007/S00422-008-0233-1 Section 4.1.3.

Bako L., et al., "Hardware Implementation of Delay-Coded Spiking-RBF Neural Network for Unsupervised Clustering," in 11th International Conference on Optimization of Electrical and Electronic Equipment (OPTIM), 2008, pp. 51-56.

Bohte S.M., et al., "Unsupervised Clustering with Spiking Neurons by Sparse Temporal Coding and Multilayer RBF Networks," in IEEE Transactions on Neural Networks, 2002, vol. 13(2), pp. 426-435.

Clopath, et al.,. "Predicting Neuronal Activity with Simple Models of the Threshold Type: Adaptive Exponential Integrate-and-Fire Model with Two Compartments," Preprint submitted to Elsevier Science, Aug. 29, 2006, 6 pgs.

Dan et al., Spike timing-dependent review plasticity of neural circuits, Neuron, Sep. 2004, pp. 23-30, vol. 44.

Duro, et al., "Discrete-Time Backpropagation for Training Synaptic Delay-Based Artificial Neural Networks," IEEE Transactions on Neural Networks, vol. 10, No. 4, Jul. 1999, pp. 779-789.

Froemke, et al. "Spike-timing-dependent synaptic modification induced by natural spike trains," Division of Neurobiology, Department of Molecular and Cell Biology, UC Berkeley, Nature, letters to nature, vol. 416, Mar. 2002, 6 pgs.

Froemke, et al. "Temporal modulation of spike-timing-dependent plastically," Frontiers in Synaptic Neuroscience, vol. 2, Article 19, Jun. 2010, 16 pgs.

Huerta, et al., "Bidirectional Synaptic Plasticity Induced by a Single Burst during Cholinergic Theta Oscillation in CA1 In Vitro," Neuron vol. 15, 1995, pp. 1053-1063.

Kubota et al., "Modulation of LTP/LTD balance in STDP by an activity-dependent feedback mechanism," Neural Network, vol. 22, 2009, pp. 527-535.

Maass, W. et al, "On the complexity of learning for spiking neurons with temporal coding", 1999.

Murakoshi, K. et al., "Firing Time of Neuron by Interference Between Synaptic Inputs," in International Conference on Systems, Man, and Cybernetics (SMC), 1999, pp. 377-382.

Natschlager, T. et al., "Spatial and temporal pattern analysis via spiking neurons", in Institute for Theoretical Computer Science, Technische Universitat Gratz, Austria, pp. 9(3): 319-32, 1998.

Ruf, B. et al, "Hebbian learning in networks of spiking neurons using temporal coding", in Biological and artifical computation: From neuroscience to technology, pp. 380-389, 1997.

Senn, et al., "An Algorithm for Synaptic Modification Based on Exact Timing of Pre- and Post-Synaptic Action Potentials," In Proceedings: ICANN, 1997, 6 pgs.

Amemori, K.I., et al., "Self-organization of delay lines by spike-time-dependent learning", Neurocomputing, Elsevier Science Publishers, Amsterdam, NL, vol. 61, Oct. 1, 2004, pp. 291-316, XP004568343, ISSN: 0925-2312, DOI: 10.1016/J.NEUC0M.2003.09.013 p. 291-p. 315.

Arena, P., et al., "STDP with adaptive synaptic delay for robot navigation control", Proceedings of SPIE, vol. 6592, May 18, 2007, XP055049378, ISSN: 0277-786X, DOI: 10.1117/12.724204 pp. 65920J-1-pp. 65920J-9, paragraph 3.

Babadi, B., et al., "Intrinsic Stability of Temporally Shifted Spike-Timing Dependent Plasticity", PLOS Computational Biology, vol. 6, No. 11, Jan. 1, 2010, pp. el000961-el000961, XP55040430, ISSN: 1553-734X, DOI: 10.1371/journal.pcbi.1000961 p. 1-p. 13, right-hand column, paragraph 4.

Bofill-I-Petit, A., et al., "Synchrony Detection and Amplification by Silicon Neurons With STDP Synapses", IEEE Transactions on Neural Networks, Service Center, Piscataway, NJ, US, vol. 15, No. 5, Sep. 1, 2004, pp. 1296-1304, XP011118617, ISSN: 1045-9227, DOI: 10.1109/TNN.2004.832842 p. 1296-p. 1303, right-hand column, paragraph 2.

Bothe, S.M., et al., "Reducing Spike Train Variability: A Computational Theory of Spike-Timing Dependent Plasticity", Advances in Neural Information Processing Systems (NIPS) 17, Jan. 1, 2005, pp. 201-208, XP055052246, Cambridge, MA [retrieved on Feb. 4, 2013].

Brette et al.,"Simulation of networks of spiking neurons: A review of tools and strategies," Springer, Journal of Computational Neuroscience, vol. 23, pp. 349-398, 2007.

Cameron, K., et al., "Spike Timing Dependent Adaptation for Mismatch Compensation", 2006 IEEE International Symposium on Circuits and Systems May 21-24, 2006 Island of Kos, Greece, IEEE—Piscataway, NJ,USA, May 21, 2006, XP010938590, DOI: 10.1109/ISCAS.2006.1692812 ISBN: 978-0-7803-9389-9, pp. 1223-1226.

(56) References Cited

OTHER PUBLICATIONS

Cap0rale, N., et al., "Spike Timing-Dependent Plasticity: A Hebbian Learning Rule", Annual Review of Neur0science, vol. 31, No. 1, Jul. 1, 2008, pp. 25-46, XP055052234, ISSN: 0147-006X, DOI: 10.1146/annurev.neuro.31.06G407.125639 abstract; figure 1 p. 31, left-hand column, paragraph 2—p. 36, left-hand column, paragraph 1.

Gils0n, M., et al., "Stability versus Neuronal Specialization for STDP: Long-Tail Weight Distributions Solve the Dilemma", PL0S ONE, vol. 6, No. 10, Jan. 1, 2011, p. e25339, XP055052242, ISSN: 1932-6203, DOI: 10.1371/journal.pone.0025339.

Hunzinger, J.V., et al., "Learning complex temporal patterns with resource-dependent spike timing-dependent plasticity", Journal of Neurophysiology, vol. 108, No. 2, Jul. 15, 2012, pp. 551-566, XP055069720, ISSN: 0022-3077, DOI:10.1152/jn.01150.2011 the whole document.

Johnston, S.P., et al., "A Hybrid Learning Algorithm Fusing STDP with GA based Explicit Delay Learning for Spiking Neurons", Intelligent Systems, 2006 3rd International IEEE Conference on, IEEE, PI, Sep. 1, 2006, XP031078858, DOI: 10.1109/IS.2006.348493ISBN: 978-1-4244-0195-6, pp. 632-637.

Nageswaran, J.M., et al., "A configurable simulation environment for the efficient simulation of large-scale spiking neural networks on graphics processors", Neural Networks, Elsevier Science Publishers, Barking, GB, vol. 22, No. 5-6, Jul. 1, 2009, pp. 791-800, XP026446158.

Park, H.O., et al., "Discrete Synapse Recurrent Neural Network for nonlinear system modeling and its application on seismic signal classification", Neural Networks (IJCNN), The 2010 International Joint Conference on, IEEE, Piscataway, NJ, USA, Jul. 18, 2010, pp. 1-7, XP031771705.

Paugam-Moisy, H., et al., "A supervised learning approach based on STDP and polychronization in spiking neuron networks", ESANN'2007 proceedings-European Symposium on Artificial Neural Networks, Apr. 1, 2007, pp. 25-27, XP055049375, Bruges, Belgium ISBN: 2930307072Retrieved from the Internet:URL:http://www.elen.ucl.ac.be/Proceedings/esann/esannpdf/es2007-95.pdf [retrieved on Jan. 11, 2013] p. 427-p. 432, line 4.

Schaik, A.V., et al., "A log-domain implementation of the Izhikevich neuron model", IEEE International Symposium on Circuits and Systems. ISCAS 2010—May 30-Jun. 2, 2010—Paris, France, IEEE, US, May 30, 2010, pp. 4253-4256, XP031724796, ISBN: 978-1-4244-5308-5 the whole document.

Schemmel J. et al., "Implementing Synaptic Plasticity in a VLSI Spiking Neural Network Model", International Joint Conference on Neural Networks, 2006. IJCNN '06, Piscataway, NJ: IEEE Operations Center, Piscataway, NJ, USA, Jan. 1, 2006, pp. 1-6, XP002557202, ISBN: 978-0-7803-9490-2 Retrieved from the Internet: URL:http://www.kip.uni-heidelberg.de/Veroeffentiichungen/download.cgi/4620/ps/1774.pdf [retrieved on Nov. 23, 2009].

Standage, D., et al., "The Trouble with Weight-Dependent STDP", Neural Networks, 2007. IJCNN 2GG7. International Joint Conference on, IEEE, Piscataway, NJ, USA, Aug. 1, 2007, pp. 1348-1353, XP031154790, ISBN: 978-1-4244-1379-9.

Tanaka, H., et al., "A CMOS Spiking Neural Network Circuit with Symmetric/Asymmetric STDP Function", IEICE Transactions on Fundamentals of Electronics,Communications and Computer Sciences, Engineering Sciences Society, Tokyo, JP, vol. E92A, No. 7, Jul. 1, 2009, pp. 1690-1698, XP001547503, ISSN: 0916-8508, DOI: 10.1587/TRANSFUN.E92.A.1690 p. 1690-p. 1696, right-hand column.

Eurich C W.,et al. "Dynamic of Self-Organized Delay Adaptation", Physical Review Letters, vol. 82, No. 7, Feb. 1999, pp. 1594-1597.

Gilson M., et al., "Emergence of Network Structure Due to Spike-Timing-Dependent Plasticity in Recurrent Neuronal Networks. I. Input Selectivity-Strengthening Correlated Input Pathways", Biological Cybernetics, Jun. 2009, pp. 81-102.

Beerhold J R., et al., "Pulse-Processing Neural Net Hardware with Selectable Topology and Adaptive Weights and Delays," Neural Networks, IJCNN International Joint Conference on, Jun. 1990, pp. 569-574.

\* cited by examiner

LEARNING SPIKE TIMING PRECISION

BACKGROUND

1. Field

Certain aspects of the present disclosure generally relate to neural networks and, more particularly, to learning and representing uncertainty in neural spike timing.

2. Background

An artificial neural network is a mathematical or computational model composed of an interconnected group of artificial neurons (i.e., neuron models). Artificial neural networks may be derived from (or at least loosely based on) the structure and/or function of biological neural networks, such as those found in the human brain. Because artificial neural networks can infer a function from observations, such networks are particularly useful in applications where the complexity of the task or data makes designing this function by hand impractical.

One type of artificial neural network is the spiking neural network, which incorporates the concept of time into its operating model, as well as neuronal and synaptic state, thereby increasing the level of realism in this type of neural simulation. Spiking neural networks are based on the concept that neurons fire only when a membrane potential reaches a threshold. When a neuron fires, it generates a spike that travels to other neurons which, in turn, raise or lower their membrane potentials based on this received spike.

SUMMARY

Certain aspects of the present disclosure generally relate to learning or determining delays between neuron models so that the uncertainty in input spike timing is accounted for in the margin of time between a delayed pre-synaptic input spike and a post-synaptic spike. In this manner, a neural network can correctly match patterns (even in the presence of significant jitter) and correctly distinguish between different noisy patterns.

Certain aspects of the present disclosure provide a method of learning in a neural network. The method generally includes determining an uncertainty associated with a first pre-synaptic spike time of a first neuron model for a pattern to be learned; and determining a delay based on the uncertainty, such that the delay added to a second pre-synaptic spike time of the first neuron model results in a causal margin of time between the delayed second pre-synaptic spike time and a post-synaptic spike time of a second neuron model. For certain aspects, the method may further comprise adding the delay to the second pre-synaptic spike time of the first neuron model, wherein the second pre-synaptic spike time is subsequent to the first pre-synaptic spike time Certain aspects of the present disclosure provide an apparatus for learning in a neural network. The apparatus generally includes a processing system configured to determine an uncertainty associated with a first pre-synaptic spike time of a first neuron model for a pattern to be learned; and to determine a delay based on the uncertainty, such that the delay added to a second pre-synaptic spike time of the first neuron model results in a causal margin of time between the delayed second pre-synaptic spike time and a post-synaptic spike time of a second neuron model. For certain aspects, the processing system is further configured to add the delay to the second pre-synaptic spike time of the first neuron model, wherein the second pre-synaptic spike time is subsequent to the first pre-synaptic spike time.

Certain aspects of the present disclosure provide an apparatus for learning in a neural network. The apparatus generally includes means for determining an uncertainty associated with a first pre-synaptic spike time of a first neuron model for a pattern to be learned; and means for determining a delay based on the uncertainty, such that the delay added to a second pre-synaptic spike time of the first neuron model results in a causal margin of time between the delayed second pre-synaptic spike time and a post-synaptic spike time of a second neuron model.

Certain aspects of the present disclosure provide a computer program product for learning in a neural network. The computer program product generally includes a computer-readable medium having instructions executable to determine an uncertainty associated with a first pre-synaptic spike time of a first neuron model for a pattern to be learned; and to determine a delay based on the uncertainty, such that the delay added to a second pre-synaptic spike time of the first neuron model results in a causal margin of time between the delayed second pre-synaptic spike time and a post-synaptic spike time of a second neuron model.

Certain aspects of the present disclosure provide a method of neural learning. The method generally includes determining a delayed pre-synaptic spike time by delaying a pre-synaptic input spike by a first time delay, determining an uncertainty factor associated with the delayed pre-synaptic spike time, and adjusting the first time delay based on the uncertainty factor.

Certain aspects of the present disclosure provide an apparatus for neural learning. The apparatus generally includes a processing system configured to determine a delayed pre-synaptic spike time by delaying a pre-synaptic input spike by a first time delay, to determine an uncertainty factor associated with the delayed pre-synaptic spike time, and to adjust the first time delay based on the uncertainty factor.

Certain aspects of the present disclosure provide an apparatus for neural learning. The apparatus generally includes means for determining a delayed pre-synaptic spike time by delaying a pre-synaptic input spike by a first time delay, means for determining an uncertainty factor associated with the delayed pre-synaptic spike time, and means for adjusting the first time delay based on the uncertainty factor.

Certain aspects of the present disclosure provide a computer-program product for neural learning. The computer-program product generally includes a computer-readable medium having instructions executable to determine a delayed pre-synaptic spike time by delaying a pre-synaptic input spike by a first time delay, to determine an uncertainty factor associated with the delayed pre-synaptic spike time, and to adjust the first time delay based on the uncertainty factor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
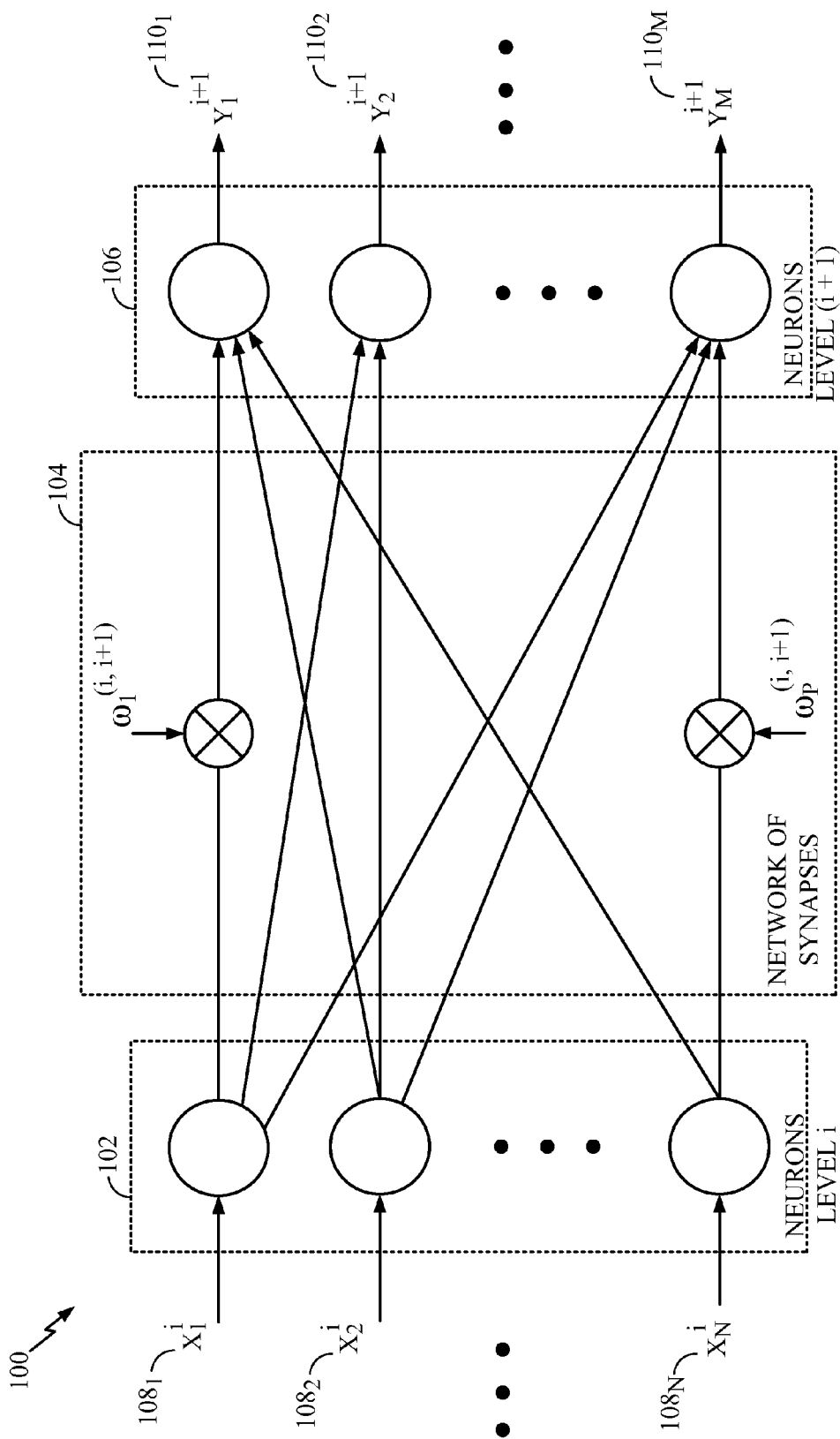
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level 102 of neurons connected to another level 106 of neurons though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated in software or in hardware (e.g., by an electrical circuit) and utilized in a large range of applications, such as image and pattern recognition, machine learning, motor control, and the like. Each neuron (or neuron model) in the neural system 100 may be implemented as a neuron circuit. The neuron membrane charged to the threshold value initiating the output spike may be implemented, for example, as a capacitor that integrates an electrical current flowing through it.

Example Learning of Uncertainty in Neural Spike Timing

Learning of spatial-temporal patterns in spiking neural networks may be achieved with spike-timing-dependent plasticity (STDP) rule and dendritic delays. However, if the spatial-temporal pattern has even slightly varying timing (such as if some of the spikes are subject to jitter), the ability of a network to learn the pattern deteriorates or can fail entirely if the jitter is substantial. Moreover, the network may also misrecognize a different pattern (having very large spike timing differences) as being the same pattern. The reason for these seemingly very different problems is actually due to the same underlying cause. The problem is the dendritic delays are such that the arrival of pre-synaptic spikes at the soma (after the delay) is not well aligned to the post-synaptic spike time. STDP reinforces causal input connections and weakens non-causal input connections, whether they are proximate in time or not. Thus, the margin or difference in time between when a pre-synaptic spike arrives at the soma and when the post-synaptic spike occurs may vary with no relation to the uncertainty in the spike timing. If the margin happens to be small, even small jitter may change a causal input to a non-causal input or vice versa. If the margin happens to be large, large timing differences (such as a different pattern) might be indistinguishable (e.g., remain causal regardless). As a result, noisy patterns often cannot be learned, and different patterns typically cannot be distinguished.

Certain aspects of the present disclosure solve both problems by addressing the root cause. Certain aspects adapt delay (e.g., dendritic delay) of a connection to coincide with the uncertainty associated with the connection input timing. Certain aspects of the present disclosure determine the uncertainty of a pre-synaptic spike time relative to a pattern and determine a synaptic (dendritic) delay that aligns the delayed time of the spike to have a causal margin of time relative to the post-synaptic spike time. The margin depends on the uncertainty. As a result, neuron models functioning in this manner can learn patterns with uncertain spike timing and distinguish patterns with substantially different timing.

The typical spike-timing-dependent plasticity (STDP) rule effectively adapts a synaptic weight of a synapse connecting neuron A to neuron B as a function of the time difference between the pre-synaptic neuron A's spike time $t_{pre}$ and post-synaptic neuron B's spike time $t_{post}$, or, without loss of generality, $\Delta t = t_{post} - t_{pre}$. A typical formulation is to increase the weight (i.e., potentiate the synapse) if the time difference is positive (pre before post) and decrease the weight (i.e., depress the synapse) if the time difference is negative (post before pre). This is typically done using an exponential decay, such as the following equation:

$$\Delta w = A_{sign(\Delta t)} e^{-|\Delta t|/\tau_{sign(\Delta t)}}$$

where $\tau_{sign(\Delta t)}$ is a time constant and $A_{sign(\Delta t)}$ is a scaling magnitude, which both typically depend on whether the difference is positive or negative. It should be evident that the weight will be increased for causal inputs (positive time difference) regardless of how large the difference is (within the order of the time constant). Similarly, the opposite occurs for non-causal inputs. Thus, if there is no jitter in a pattern of pre-synaptic spikes, once learning is converged, a neuron may have reinforced connections to inputs with different delays, as depicted in FIG. 2.

Figure 2:
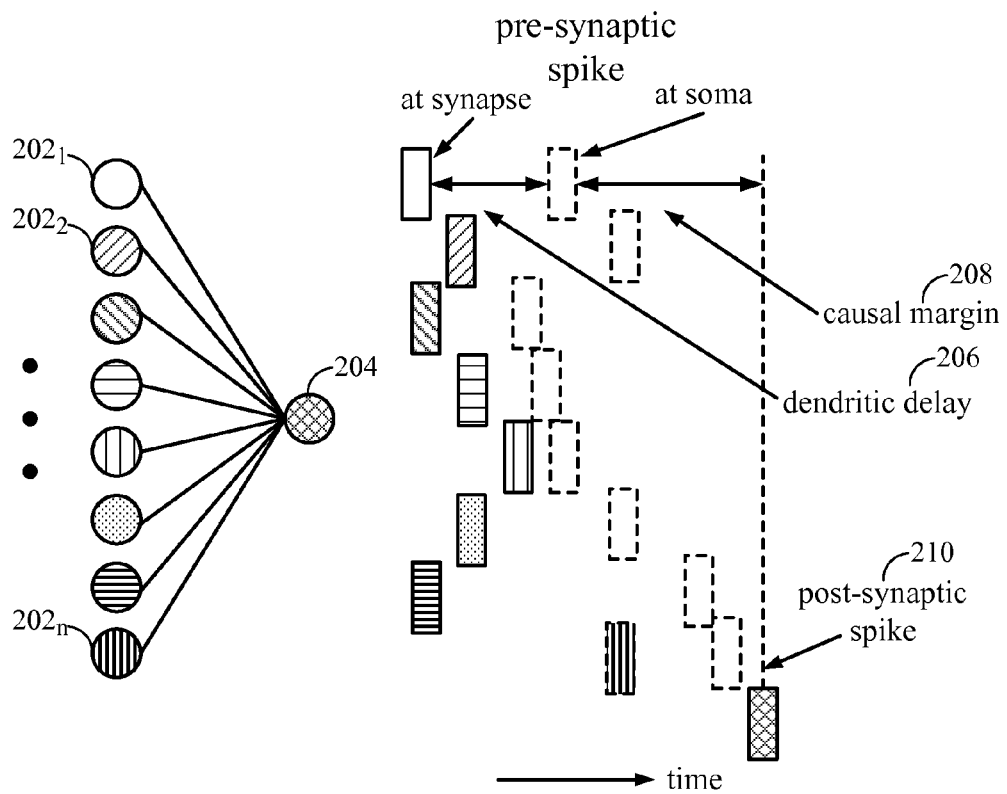
FIG. 2 illustrates a post-synaptic neuron having reinforced connections to inputs from several pre-synaptic neurons with various delays, in accordance with certain aspects of the present disclosure.

FIG. 2 illustrates several pre-synaptic neurons 202 connected to a post-synaptic neuron 204. Although eight pre-synaptic neurons 202 are shown, the present disclosure applies to any number n of pre-synaptic neurons 202. The pre-synaptic neurons 202 have various dendritic delays 206, each representing the delay between receiving a spike at a dendrite of a particular neuron after a synapse (the "pre-synaptic spike") and this spike reaching the soma of the same neuron (the "delayed pre-synaptic spike"). The delayed pre-synaptic spike for each of the pre-synaptic neurons 202 is illustrated with dashed lines in FIG. 2.

In FIG. 2, only reinforced connections are shown. The dendritic delay 206 for the connections is random but sufficiently small in every case that the pre-synaptic spike occurs before the post-synaptic spike 210, even considering the dendritic delay 206. However, the margin of time between the delayed pre-synaptic spike and the post-synaptic spike 210 varies randomly, as well. For the first pre-synaptic neuron $202_1$, this margin is a causal margin 208 because the delayed pre-synaptic spike occurs before the post-synaptic spike 210.

Figure 3:
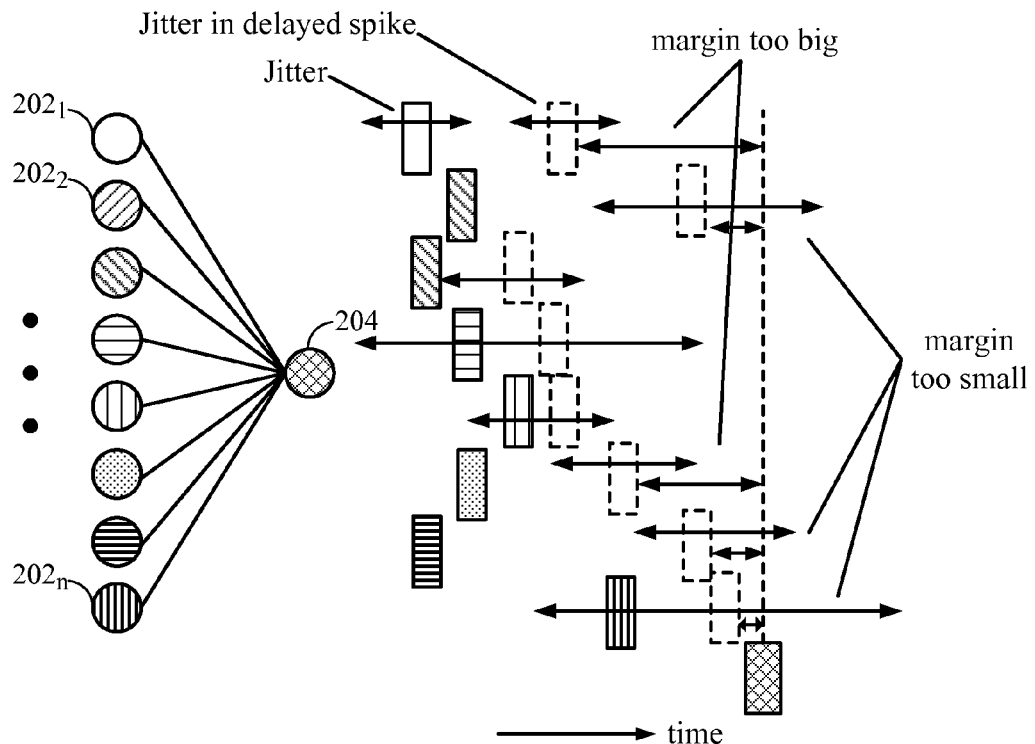
FIG. 3 illustrates jitter in the delayed pre-synaptic spikes of FIG. 2, showing margins (relative to the post-synaptic spike time) that are both too small and needlessly large compared to the jitter, in accordance with certain aspects of the present disclosure.

If a pre-synaptic spike has jitter as illustrated in FIG. 3, this spike may arrive at the soma at an earlier or later time. If the spike arrives too late (after the post-synaptic spike 210) the margin may be insufficient to prevent the weight of the connection from being depressed (weakened) by STDP (i.e., "margin too small"). Thus, the neuron may be unable to learn a pattern with jitter. Moreover, whether or not the neuron can learn a spike in a pattern is random because of the random dendritic delay. In other words, there is little or no dependence on the amount of jitter.

For example, a spike with large jitter might be learned if there happens to be a large margin (e.g., the fourth pre-synaptic neuron $202_4$ shaded with the relatively thinner horizontal lines). However, a spike with small jitter might fail to be learned if there happens to be a small margin (e.g., the seventh pre-synaptic neuron $202_7$ shaded with the relatively thicker horizontal lines). Since the margin may have no relation to the amount of uncertainty, learning of an uncertain pattern is problematic. First, a pattern with a slight variation may fail to be learned or failed to be recognized. Second, a pattern with a large variation (which is actually a different pattern) may be mistakenly recognized as the same pattern (i.e., "margin too big"). In FIG. 3, for clarity, the jitter range is shown only for the delayed spikes (with the exception of the first input), since the jitter range is of the same extent as that for the corresponding non-delayed spikes.

Certain aspects of the present disclosure determine dendritic delay of a connection to coincide with the uncertainty associated with the connection input timing. For certain aspects, the delay is adapted. Alternatively, a synapse with a particular delay may be selected from among a plurality of synapses with different delays. Those synapses would have the same input, but different delays. By selecting from among them, the effective delay of the input's spike is changed.

Figure 4:
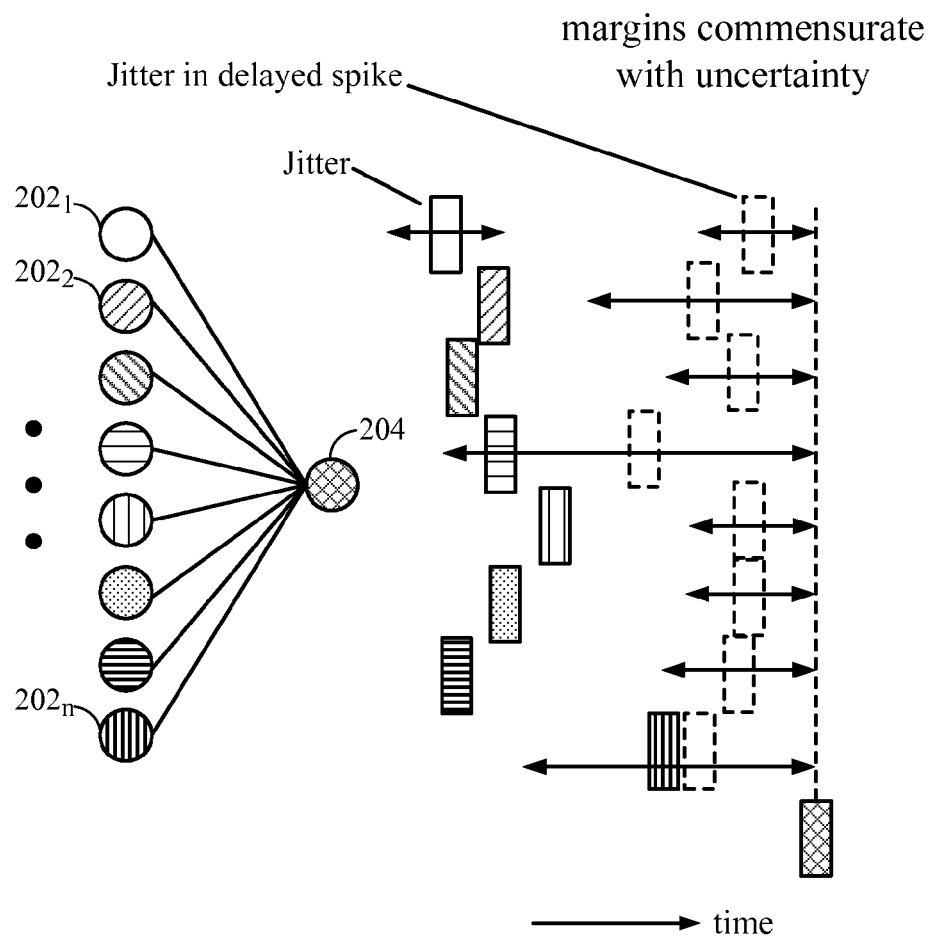
FIG. 4 illustrates using adjusted delays, such that the margins are commensurate with uncertainty, in accordance with certain aspects of the present disclosure.

Certain aspects of the present disclosure determine the uncertainty of a pre-synaptic spike time within a pattern. Although the uncertainty may be determined directly from multiple instances of a pattern or from a known parameter, for certain aspects, the variation in spike timings may be experienced by the neuron across repetitions of the pattern (e.g., with jitter) while the delay is being adapted. By adapting the delay during the exposure to the pattern and learning of synaptic weights, the delay adaptation accounts for the uncertainty observed in the spike timing. In either case, a synaptic (dendritic) delay is determined which aligns the delayed time of the spike to have a margin of time relative to the post-synaptic spike time, as illustrated in FIG. 4. The margin is a function of the uncertainty so that if uncertainty is large, the margin is large and vice versa.

As a result, neurons implementing aspects of the present disclosure can learn patterns with uncertain spike timing and distinguish patterns with substantially different timing. If a pattern has uncertain spike timing, the margin resulting from the adjusted delay will be commensurate with this uncertainty, and thus, the post-synaptic neuron can recognize the pattern with variance. If a first pattern has particular spike timing and a second pattern has a different spike timing, then a post-synaptic neuron selective to the first pattern will have a margin commensurate with the particular timing of the first pattern. Therefore, if given the different timing of the second pattern, that neuron will be able to distinguish the second from the first because the timing is beyond that associated with the uncertainty in the first.

Figure 5:
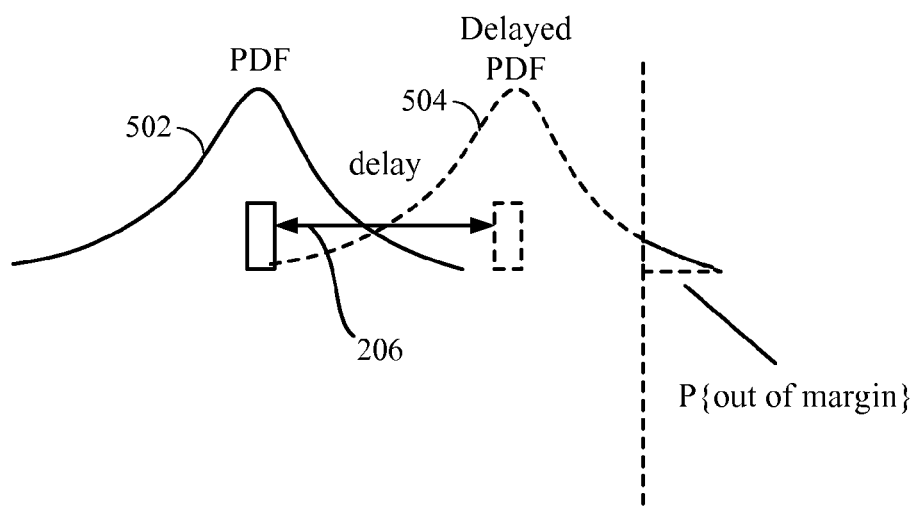
FIG. 5 illustrates example probability density functions (PDFs) of jitter for the pre-synaptic spike and for the delayed pre-synaptic spike, in accordance with certain aspects of the present disclosure.

Above, jitter is considered in the sense of spike timing having a range with clear bounds. However, jitter may be random to the extent one can only describe the jitter as a probability distribution, such as a Gaussian distribution. For example, FIG. 5 illustrates an example probability density function (PDF) 502 of jitter for the pre-synaptic spike and the PDF 504 for the delayed pre-synaptic spike, delayed by the dendritic delay 206. With such probability distributions, the tail may be large, and one is generally not interested in accounting for the largest possible variance. Instead, one is typically interested in having a margin that accounts for a particular likelihood of the jitter (e.g., 95%). In that case, the margin may be commensurate with the cumulative percentile of the distribution (e.g., $95^{th}$ percentile). To put this in other words, a margin is desired that places the probability that the delayed pre-synaptic spike is out of margin beyond the post-synaptic spike at a predetermined threshold (e.g., 5%).

Determining Delay Directly

If the uncertainty of a pre-synaptic spike time for input i is known, for example if the pre-synaptic spike time has a probability distribution $P\{\Delta t_i\}$, where $\Delta t_i$ is time relative to the post-synaptic spike time (or other pattern reference time), then the delay $\tau_i$ for that synapse may be determined directly to achieve a particular margin commensurate with the uncertainty. For example, suppose one wishes to accommodate an uncertainty on the order of the standard deviation $\sigma_i = E\{\sqrt{\Sigma(\Delta t_i - \Delta \bar{t}_i)^2}\}$ of the distribution of $\Delta t_i$ but no larger. In that case, a pre-synaptic spike time that is later than the mean $\Delta \bar{t}_i = E\{\Delta t_i\}$ by an amount equal to the standard deviation of the distribution may be delayed by an amount $\tau_i$ such that the delayed pre-synaptic spike time occurs no later than the post-synaptic spike time (which is the reference in this example, i.e., 0). Thus, $$\Delta \bar{t}_i - \tau_i - \sigma_i \geq 0$$

For example, if a pre-synaptic spike occurs 10 ms, on average, prior to the post-synaptic spike, then $\Delta \bar{t}_i = 10$. Suppose this has a variance of 4 ms, or $\sigma_i = 2$. This indicates a delay of no more than 8 ms to accommodate that variance in the pattern. Thus, a method to determine delay directly is available when the statistics of the pattern are known. In effect, one may set the delay to achieve any desired probability of having the pre-synaptic spike occur before the post-synaptic spike.

Adapting Delay

As an alternative, one may adapt or determine delay more indirectly to achieve the desired effect, and this may be performed when the pattern is being observed on-the-fly. Such delay adaptations may be performed periodically or continuously.

In simplest form, certain aspects of the present disclosure involve adapting delay as follows:

decrease delay to obtain a larger margin if the pre-synaptic spike timing is less certain.

increase delay to obtain a smaller margin if the pre-synaptic spike timing is more certain.

While the certainty or uncertainty of spike timing may be determined directly from an ensemble of pattern instances or as a given parameter, it may also be determined on-the-fly by estimating uncertainty as different variations of the pattern are being observed.

As another alternative, the uncertainty may be accounted for indirectly. For example, uncertainty may be accounted for as follows:

if, for a given pattern, a delayed pre-synaptic spike occurs relatively close (or too late) to the post-synaptic spike time, the uncertainty is determined to be potentially larger than expected/anticipated, the margin is determined to be too small, and the margin is increased by an incremental amount.

if, for a given pattern, a delayed pre-synaptic spike occurs relatively far in advance of the post-synaptic spike time, the uncertainty is determined to be potentially smaller than expected/anticipated, the margin is determined to be too large, and the margin is decreased by an incremental amount.

Figure 6:
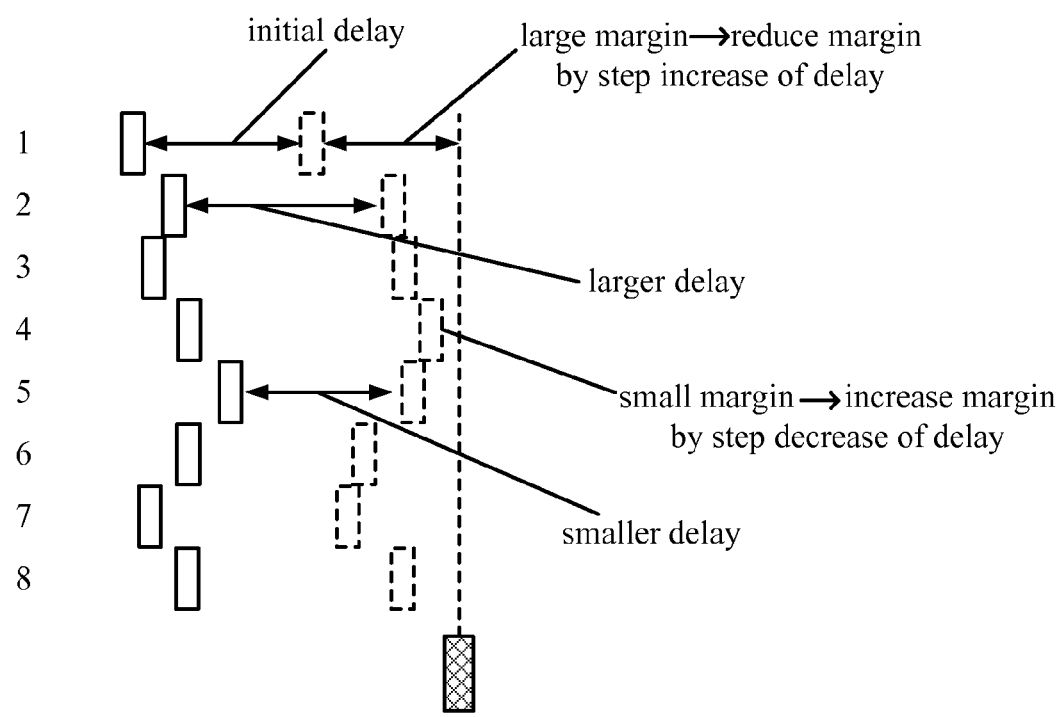
FIG. 6 illustrates an example scheme for adapting delay, in accordance with certain aspects of the present disclosure.

The above may be simplified even further into a simple algorithm which increases delay if the delayed pre-synaptic spike occurs substantially before the post-synaptic and decreases delay otherwise. FIG. 6 shows an example in which the delay is adapted according to this principle. At first (repetition #1), the initial delay results in a delayed pre-synaptic spike that is far in advance of the post-synaptic spike. Thus, the margin is large, and the margin is reduced by a step increase of the delay (i.e., an incremental delay increase). However, in the next repetition of the pattern (#2), this particular pre-synaptic spike occurs later (e.g., due to jitter) and the delay brings the delayed spike closer to the post-synaptic spike (a smaller margin). However, since this is not very close (e.g., is outside a certain margin threshold), so delay is increased again. At a certain point (repetition #4 in FIG. 6), the jitter results in a spike that is quite late. As a result, with the increased delay, the margin is very small (e.g., within the margin threshold). Thus, the delay is step decreased in an effort to obtain a safer (i.e., larger) margin. This process is an ongoing mechanism, so the delay may be continuously adapting. If the increments of increase and decrease are relatively small, then the delay may most likely converge to a value that results in an appropriate margin.

For certain aspects, the algorithm may include a look-ahead mechanism for determining whether a step delay increase will cause (a probability of) the delayed spike to be within the margin threshold (or to occur after the post-synaptic spike, such that the delayed spike will be non-causal). If the result of this look-ahead is true, the delay may not be increased, or at least may not be increased by the full delay increment attempted.

For certain aspects, the delay increments may be the same for both increase and decrease directions, while for other aspects, the delay increments may be different for the increase and decrease directions. Furthermore, the delay increments may change based on previous adjustments (i.e., the adjustment history). For example, the delay increments may get progressively smaller with consecutive delay increases (or consecutive delay decreases) for certain aspects. Once the delay adjustment direction changes (i.e., from increase to decrease or vice versa), the delay increment may return to its initial, relatively larger value.

A variation on the above is to increase or decrease the delay by an amount depending on the time difference between pre- and post-synaptic spikes. For example, if the pre-post (or post-pre) time is very small, no delay plasticity adjustment is made; otherwise the delay is adjusted by an amount that is a function of the time difference and whether this difference is negative or positive. This may be referred to as the structural delay plasticity model or temporal plasticity.

Using Indirect Indications of Uncertainty

Alternatively delay may be indirectly determined using indirect indications of uncertainty in spike timing. For example, the derivative of the sign of change in weight of a synapse is a measure of how consistent or inconsistent the synaptic plasticity mechanism is:

$$\frac{d}{dt}\text{sign}(\Delta w(t)) \text{ or } \Delta w(n) - \Delta w(n-1)$$

If the weight of a synapse keeps changing in the same direction (increasing for long-term potentiation (LTP) or decreasing for long-term depression (LTD)), then one may deduce from the shape of the typical STDP curve that the pre-synaptic spike has a consistent order relative to the post-synaptic spike (before for LTP and after for LTD). However, if the weight of a synapse keeps changing in opposite direction (i.e., the derivative of the sign is negative), the presynaptic spike is sometimes occurring after the post and sometimes before, thereby indicating uncertainty to the extent that the margin is insufficient.

However, this is only one example. Another example is cumulative weight change, which may be expressed as follows:

$$\int \Delta w(t) dt$$

or $$\Sigma \Delta w(n)$$

If the cumulative weight change (or moving average, for example), is near zero, then LTP and LTD may be competing, which suggests the pre-synaptic spike is occurring before and after the post-synaptic spike (i.e., inconsistently). Thus, one may again deduce uncertainty to the extent that the margin is insufficient. However, if the integral weight change is non-zero (significant negative or positive number), then one may deduce that the pre-synaptic spike is often (or even always) occurring in the same order with respect to the post-synaptic spike (before for positive value, after for negative value).

Accordingly, there are a variety of means to determine uncertainty based on weight change and thus to adapt the delay accordingly to achieve a commensurate margin.

Coding Uncertainty in Weights

Connection weight may also be determined based on uncertainty. Alternatively a combination of connection delay and weight may be determined based on uncertainty. Generally, as delay is increased, a synaptic input contribution is reduced in effect statistically in models that are leaky (e.g., leaky-integrate-and-fire (LIF) neuron models). A similar effect may be achieved by lowering weight for inputs that are more uncertain or by a combination of increase in delay and decrease in weight.

Weight may be used as a measure of the signal variance: the higher the variance, the smaller the weight. That is, one may separate two components of a signal, using latency (location of the synapse) to code for the relative spike timing of the spike pattern, and use the weight to code for the variance of that feature/input. For certain aspects, the weight may be determined based on uncertainty (e.g., discounting uncertain inputs), and the delay may be determined, for example, to align the relative timing of inputs (e.g., aligning the expected times of pre-synaptic spikes rather than their uncertainty margins/bounds).

Relation to Resource Model

The resource model (or "multi-spike neural learning" model) utilizes a learning method which is more biologically accurate than independent STDP. In the resource model, a synaptic weight may be adapted depending on a resource associated with the synapse, which may be depleted by weight change and may recover over time. The resource model also significantly improves temporal pattern learning in several ways: speed, robustness, diversity, etc.

The concept of the resource model is that there is a shared resource which modulates weight changes and is in turn dependent upon weight changes. For this reason, the resources available for a synaptic weight change are also an indication of spike timing uncertainty. If the weight has been changing a lot, resources are used up and take time to recover. Conversely, if weights are not changing, the resources are more available for subsequent weight changes. Also, the closer the delayed pre-synaptic spike is to the post-synaptic spike, the larger the weight change, and the more resources are consumed. When on the causal side (pre before post), the larger the change/amount of resources consumed, the closer one is to the limit of the margin.

Generally, with the resource model, LTP and LTD are cooperative (as opposed to competitive as with independent STDP). For this reason, when there are low resources, this is typically a sign of consistent and substantial weight changes. However, if the resources are high, weight changes are not occurring as often or by as much, and this may be due to a large pre-post time difference, indicating the margin may be larger than necessary.

As a result of the above, one may use resources (or lack thereof) as an indication for delay adaptation. First, normal delay adaptation may be applied based on the pre-post time as described above (e.g., according to the structural delay plasticity model). If one observes pre-before-post by at least some minimum time, delay may be increased. If one observes post-before-pre by at least some minimum time, delay may be decreased. Second, the resource model is applied. However, the resource model may be linked to the structural delay plasticity model as follows: if resources are high, there is no change, but if resources are low, the delay adaptation is reversed (increasing instead of decreasing and vice versa).

It should be understood that there are variations on this within the scope of the present disclosure (i.e., adapting delay based on the resources available for synaptic weight change (strength modulation)).

Example Operations

Figure 7:
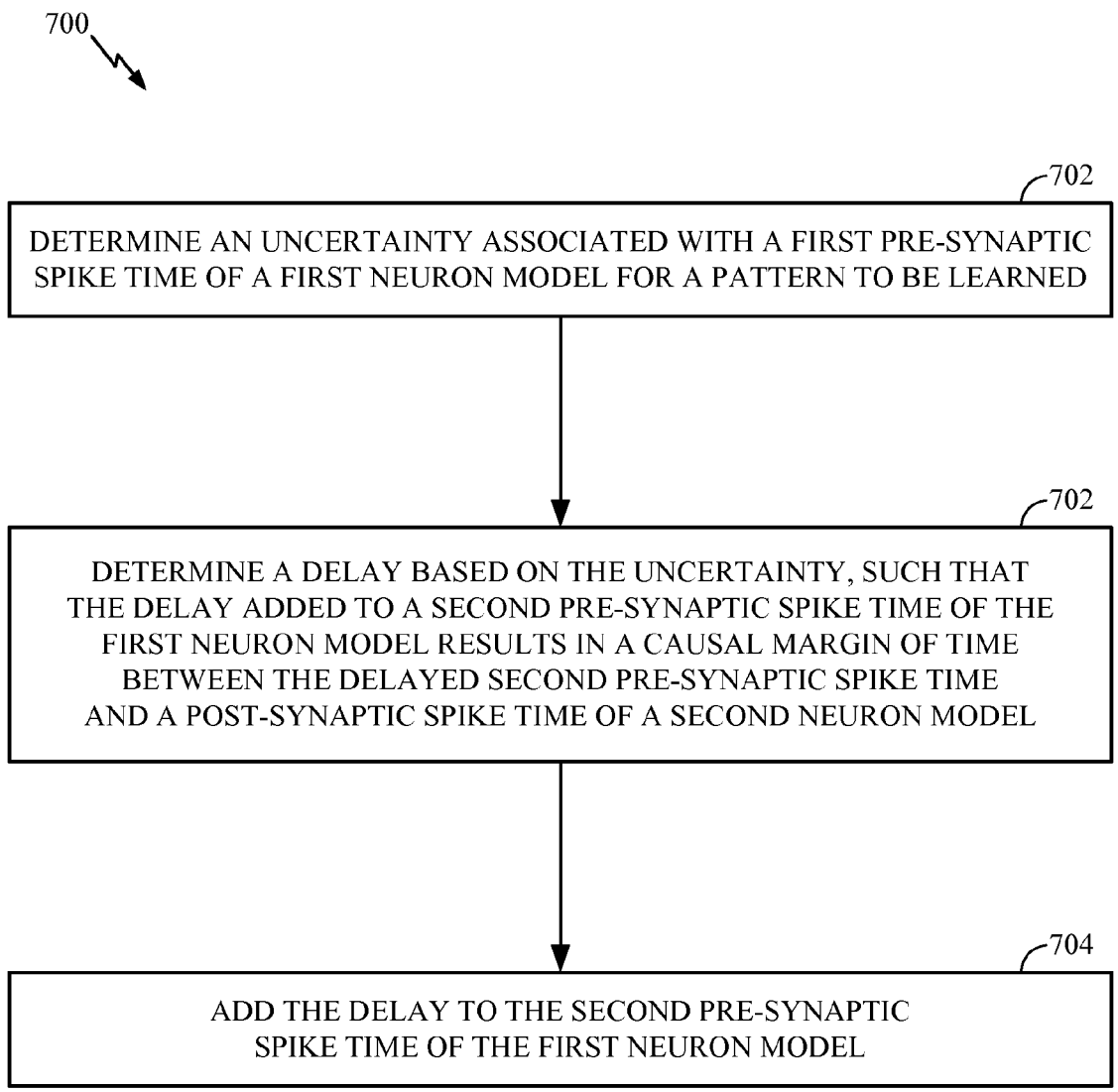
FIG. 7 is a flow diagram of example operations for determining a delay based on an uncertainty associated with a pre-synaptic spike time of a neuron model, in accordance with certain aspects of the present disclosure.

FIG. 7 is a flow diagram of example operations 700 for determining a delay based on an uncertainty associated with a pre-synaptic spike time of a neuron model, in accordance with certain aspects of the present disclosure. The operations 700 may be performed in hardware (e.g., by one or more processing units), in software, or in firmware.

The operations 700 may begin, at 702, by determining an uncertainty associated with a first pre-synaptic spike time of a first neuron model for a pattern to be learned. At 704, a delay may be determined based on the uncertainty. The delay is determined such that the delay added to a second pre-synaptic spike time of the first neuron model results in a causal margin of time between the delayed second pre-synaptic spike time and a post-synaptic spike time of a second neuron model. For certain aspects, determining the delay includes selecting a synapse with the delay from among a plurality of synapses with different delays.

According to certain aspects, the operations 700 may further include adding the delay to the second pre-synaptic spike time of the first neuron model. The second pre-synaptic spike time may be subsequent to the first pre-synaptic spike time.

According to certain aspects, the operations 700 may further include determining another uncertainty (i.e., a second uncertainty) associated with a third pre-synaptic spike time of a third neuron model for the pattern to be learned. Another delay (i.e., a second delay) may be determined based on the other uncertainty (the second uncertainty). The other delay (the second delay) may be determined such that this other delay added to a fourth pre-synaptic spike time of the third neuron model results in a causal margin of time between the delayed fourth pre-synaptic spike time and the post-synaptic spike time of the second neuron model. For certain aspects, the operations 700 may further include adding the other delay (the second delay) to the fourth pre-synaptic spike time of the third neuron model. The fourth pre-synaptic spike time may be subsequent to the third pre-synaptic spike time.

According to certain aspects, the margin is a function of the uncertainty. The uncertainty may comprise a range of pre-synaptic spike timing with defined bounds. For certain aspects, the uncertainty comprises a probability distribution.

In this case, determining the delay at 704 may include calculating the delay based on the probability distribution to achieve a desired probability of having the delayed second pre-synaptic spike time occur before the post-synaptic spike time. The uncertainty may include at least one of a synaptic weight change amount, a derivative of a sign of a synaptic weight change, or an accumulated synaptic weight change, for a synapse between the first and second neuron models.

According to certain aspects, determining the uncertainty at 702 involves determining the uncertainty directly from multiple instances of the pattern. According to other aspects, determining the uncertainty at 702 includes observing different variations of the pattern. In this case, determining the delay at 704 may include adjusting the delay based on each of the observed variations. The first pre-synaptic spike time may be delayed by a previously determined delay. For certain aspects, adjusting the delay includes: (1) decreasing the delay to increase the margin if the post-synaptic spike time occurs within a first time threshold of the delayed first pre-synaptic spike time; and (2) increasing the delay to decrease the margin if the post-synaptic spike time occurs more than a second time threshold after the delayed first pre-synaptic spike time. For other aspects, adjusting the delay includes: (1) increasing the delay to decrease the margin if the delayed first pre-synaptic spike time occurs substantially before the post-synaptic spike time; and (2) decreasing the delay to increase the margin if the delayed first pre-synaptic spike time does not occur substantially before the post-synaptic spike time.

According to certain aspects, the operations 700 may further include determining a synaptic weight of a synapse between the first and second neuron models based on the uncertainty. For certain aspects, the operations 700 may further include using the delay to adjust an expected time of a pre-synaptic spike for the first neuron model relative to another expected time of another pre-synaptic spike for a third neuron model.

According to certain aspects, the operations 700 may further include outputting at least one of the uncertainty, the delay, or the pattern to be learned to a display.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, the means for displaying may comprise a display (e.g., a monitor, flat screen, touch screen, and the like), a printer, or any other suitable means for outputting data for visual depiction, such as a table, chart, or graph. The means for processing, means for adding, means for using, means for aligning, or means for determining may comprise a processing system, which may include one or more processors or processing units. The means for storing may comprise a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of learning in a neural network, comprising:
   determining an uncertainty associated with a first pre-synaptic spike time of a first neuron model for a pattern to be learned; and
   determining a delay based on the uncertainty, such that the delay added to a second pre-synaptic spike time of the first neuron model results in a causal margin of time between the delayed second pre-synaptic spike time and a post-synaptic spike time of a second neuron model.

2. The method of claim 1, further comprising adding the delay to the second pre-synaptic spike time of the first neuron model, wherein the second pre-synaptic spike time is subsequent to the first pre-synaptic spike time.

3. The method of claim 1, further comprising:
determining another uncertainty associated with a third pre-synaptic spike time of a third neuron model for the pattern to be learned; and
determining another delay based on the other uncertainty, such that the other delay added to a fourth pre-synaptic spike time of the third neuron model results in another causal margin of time between the delayed fourth pre-synaptic spike time and the post-synaptic spike time of the second neuron model.

4. The method of claim 3, further comprising adding the other delay to the fourth pre-synaptic spike time of the third neuron model, wherein the fourth pre-synaptic spike time is subsequent to the third pre-synaptic spike time.

5. The method of claim 1, wherein the margin is a function of the uncertainty.

6. The method of claim 1, wherein the uncertainty comprises a range of pre-synaptic spike timing with defined bounds.

7. The method of claim 1, wherein the uncertainty comprises a probability distribution and wherein determining the delay comprises calculating the delay based on the probability distribution to achieve a desired probability of having the delayed second pre-synaptic spike time occur before the post-synaptic spike time.

8. The method of claim 1, wherein determining the uncertainty comprises determining the uncertainty directly from multiple instances of the pattern.

9. The method of claim 1, wherein determining the uncertainty comprises observing different variations of the pattern and wherein determining the delay comprises adjusting the delay based on each of the observed variations.

10. The method of claim 9, wherein the first pre-synaptic spike time is delayed by a previously determined delay and wherein adjusting the delay comprises:
decreasing the delay to increase the margin if the post-synaptic spike time occurs within a first time threshold of the delayed first pre-synaptic spike time; and
increasing the delay to decrease the margin if the post-synaptic spike time occurs more than a second time threshold after the delayed first pre-synaptic spike time.

11. The method of claim 9, wherein the first pre-synaptic spike time is delayed by a previously determined delay and wherein adjusting the delay comprises:
increasing the delay to decrease the margin if the delayed first pre-synaptic spike time occurs substantially before the post-synaptic spike time; and
decreasing the delay to increase the margin if the delayed first pre-synaptic spike time does not occur substantially before the post-synaptic spike time.

12. The method of claim 1, wherein the uncertainty comprises at least one of a synaptic weight change amount, a derivative of a sign of a synaptic weight change, or an accumulated synaptic weight change, for a synapse between the first and second neuron models.

13. The method of claim 1, further comprising determining a synaptic weight of a synapse between the first and second neuron models based on the uncertainty.

14. The method of claim 1, further comprising using the delay to adjust an expected time of a pre-synaptic spike for the first neuron model relative to another expected time of another pre-synaptic spike for a third neuron model.

15. The method of claim 1, wherein determining the delay comprises selecting a synapse with the delay from among a plurality of synapses with different delays.

16. An apparatus for learning in a neural network, comprising:
a processing system configured to:
determine an uncertainty associated with a first pre-synaptic spike time of a first neuron model for a pattern to be learned; and
determine a delay based on the uncertainty, such that the delay added to a second pre-synaptic spike time of the first neuron model results in a causal margin of time between the delayed second pre-synaptic spike time and a post-synaptic spike time of a second neuron model.

17. The apparatus of claim 16, wherein the processing system is further configured to add the delay to the second pre-synaptic spike time of the first neuron model and wherein the second pre-synaptic spike time is subsequent to the first pre-synaptic spike time.

18. The apparatus of claim 16, wherein the processing system is further configured to:
determine another uncertainty associated with a third pre-synaptic spike time of a third neuron model for the pattern to be learned; and
determine another delay based on the other uncertainty, such that the other delay added to a fourth pre-synaptic spike time of the third neuron model results in another causal margin of time between the delayed fourth pre-synaptic spike time and the post-synaptic spike time of the second neuron model.

19. The apparatus of claim 18, wherein the processing system is further configured to add the other delay to the fourth pre-synaptic spike time of the third neuron model and wherein the fourth pre-synaptic spike time is subsequent to the third pre-synaptic spike time.

20. The apparatus of claim 16, wherein the margin is a function of the uncertainty.

21. The apparatus of claim 16, wherein the uncertainty comprises a range of pre-synaptic spike timing with defined bounds.

22. The apparatus of claim 16, wherein the uncertainty comprises a probability distribution and wherein the processing system is configured to determine the delay by calculating the delay based on the probability distribution to achieve a desired probability of having the delayed second pre-synaptic spike time occur before the post-synaptic spike time.

23. The apparatus of claim 16, wherein the processing system is configured to determine the uncertainty directly from multiple instances of the pattern.

24. The apparatus of claim 16, wherein the processing system is configured to determine the uncertainty by observing different variations of the pattern and wherein the processing system is configured to determine the delay by adjusting the delay based on each of the observed variations.

25. The apparatus of claim 24, wherein the first pre-synaptic spike time is delayed by a previously determined delay and wherein adjusting the delay comprises:
decreasing the delay to increase the margin if the post-synaptic spike time occurs within a first time threshold of the delayed first pre-synaptic spike time; and
increasing the delay to decrease the margin if the post-synaptic spike time occurs more than a second time threshold after the delayed first pre-synaptic spike time.

26. The apparatus of claim 24, wherein the first pre-synaptic spike time is delayed by a previously determined delay and wherein adjusting the delay comprises:
increasing the delay to decrease the margin if the delayed first pre-synaptic spike time occurs substantially before the post-synaptic spike time; and decreasing the delay to increase the margin if the delayed first pre-synaptic spike time does not occur substantially before the post-synaptic spike time.

27. The apparatus of claim 16, wherein the uncertainty comprises at least one of a synaptic weight change amount, a derivative of a sign of a synaptic weight change, or an accumulated synaptic weight change, for a synapse between the first and second neuron models.

28. The apparatus of claim 16, wherein the processing system is further configured to determine a synaptic weight of a synapse between the first and second neuron models based on the uncertainty.

29. The apparatus of claim 16, wherein the processing system is further configured to use the delay to adjust an expected time of a pre-synaptic spike for the first neuron model relative to another expected time of another pre-synaptic spike for a third neuron model.

30. The apparatus of claim 16, wherein the processing system is configured to determine the delay by selecting a synapse with the delay from among a plurality of synapses with different delays.

31. An apparatus for learning in a neural network, comprising:
means for determining an uncertainty associated with a first pre-synaptic spike time of a first neuron model for a pattern to be learned; and
means for determining a delay based on the uncertainty, such that the delay added to a second pre-synaptic spike time of the first neuron model results in a causal margin of time between the delayed second pre-synaptic spike time and a post-synaptic spike time of a second neuron model.

32. The apparatus of claim 31, further comprising means for adding the delay to the second pre-synaptic spike time of the first neuron model, wherein the second pre-synaptic spike time is subsequent to the first pre-synaptic spike time.

33. The apparatus of claim 31, further comprising:
means for determining another uncertainty associated with a third pre-synaptic spike time of a third neuron model for the pattern to be learned; and
means for determining another delay based on the other uncertainty, such that the other delay added to a fourth pre-synaptic spike time of the third neuron model results in another causal margin of time between the delayed fourth pre-synaptic spike time and the post-synaptic spike time of the second neuron model.

34. The apparatus of claim 33, further comprising means for adding the other delay to the fourth pre-synaptic spike time of the third neuron model, wherein the fourth pre-synaptic spike time is subsequent to the third pre-synaptic spike time.

35. The apparatus of claim 31, wherein the margin is a function of the uncertainty.

36. The apparatus of claim 31, wherein the uncertainty comprises a range of pre-synaptic spike timing with defined bounds.

37. The apparatus of claim 31, wherein the uncertainty comprises a probability distribution and wherein the means for determining the delay is configured to calculate the delay based on the probability distribution to achieve a desired probability of having the delayed second pre-synaptic spike time occur before the post-synaptic spike time.

38. The apparatus of claim 31, wherein the means for determining the uncertainty is configured to determine the uncertainty directly from multiple instances of the pattern.

39. The apparatus of claim 31, wherein the means for determining the uncertainty is configured to observe different variations of the pattern and wherein the means for determining the delay is configured to adjust the delay based on each of the observed variations.

40. The apparatus of claim 39, wherein the first pre-synaptic spike time is delayed by a previously determined delay and wherein adjusting the delay comprises:
decreasing the delay to increase the margin if the post-synaptic spike time occurs within a first time threshold of the delayed first pre-synaptic spike time; and
increasing the delay to decrease the margin if the post-synaptic spike time occurs more than a second time threshold after the delayed first pre-synaptic spike time.

41. The apparatus of claim 39, wherein the first pre-synaptic spike time is delayed by a previously determined delay and wherein adjusting the delay comprises:
increasing the delay to decrease the margin if the delayed first pre-synaptic spike time occurs substantially before the post-synaptic spike time; and
decreasing the delay to increase the margin if the delayed first pre-synaptic spike time does not occur substantially before the post-synaptic spike time.

42. The apparatus of claim 31, wherein the uncertainty comprises at least one of a synaptic weight change amount, a derivative of a sign of a synaptic weight change, or an accumulated synaptic weight change, for a synapse between the first and second neuron models.

43. The apparatus of claim 31, further comprising means for determining a synaptic weight of a synapse between the first and second neuron models based on the uncertainty.

44. The apparatus of claim 31, further comprising means for using the delay to adjust an expected time of a pre-synaptic spike for the first neuron model relative to another expected time of another pre-synaptic spike for a third neuron model.

45. The apparatus of claim 31, wherein the means for determining the delay is configured to select a synapse with the delay from among a plurality of synapses with different delays.

46. A computer program product for learning in a neural network, comprising a computer-readable medium comprising instructions executable to:
determine an uncertainty associated with a first pre-synaptic spike time of a first neuron model for a pattern to be learned; and
determine a delay based on the uncertainty, such that the delay added to a second pre-synaptic spike time of the first neuron model results in a causal margin of time between the delayed second pre-synaptic spike time and a post-synaptic spike time of a second neuron model.

47. The computer program product of claim 46, further comprising instructions executable to add the delay to the second pre-synaptic spike time of the first neuron model, wherein the second pre-synaptic spike time is subsequent to the first pre-synaptic spike time.

48. The computer program product of claim 46, further comprising instructions executable to:
determine another uncertainty associated with a third pre-synaptic spike time of a third neuron model for the pattern to be learned; and
determine another delay based on the other uncertainty, such that the other delay added to a fourth pre-synaptic spike time of the third neuron model results in another causal margin of time between the delayed fourth pre-synaptic spike time and the post-synaptic spike time of the second neuron model.

49. The computer program product of claim 48, further comprising instructions executable to add the other delay to the fourth pre-synaptic spike time of the third neuron model, wherein the fourth pre-synaptic spike time is subsequent to the third pre-synaptic spike time.

50. The computer program product of claim 46, wherein the margin is a function of the uncertainty.

51. The computer program product of claim 46, wherein the uncertainty comprises a range of pre-synaptic spike timing with defined bounds.

52. The computer program product of claim 46, wherein the uncertainty comprises a probability distribution and wherein determining the delay comprises calculating the delay based on the probability distribution to achieve a desired probability of having the delayed second pre-synaptic spike time occur before the post-synaptic spike time.

53. The computer program product of claim 46, wherein determining the uncertainty comprises determining the uncertainty directly from multiple instances of the pattern.

54. The computer program product of claim 46, wherein determining the uncertainty comprises observing different variations of the pattern and wherein determining the delay comprises adjusting the delay based on each of the observed variations.

55. The computer program product of claim 54, wherein the first pre-synaptic spike time is delayed by a previously determined delay and wherein adjusting the delay comprises:
 decreasing the delay to increase the margin if the post-synaptic spike time occurs within a first time threshold of the delayed first pre-synaptic spike time; and
 increasing the delay to decrease the margin if the post-synaptic spike time occurs more than a second time threshold after the delayed first pre-synaptic spike time.

56. The computer program product of claim 54, wherein the first pre-synaptic spike time is delayed by a previously determined delay and wherein adjusting the delay comprises:
 increasing the delay to decrease the margin if the delayed first pre-synaptic spike time occurs substantially before the post-synaptic spike time; and
 decreasing the delay to increase the margin if the delayed first pre-synaptic spike time does not occur substantially before the post-synaptic spike time.

57. The computer program product of claim 46, wherein the uncertainty comprises at least one of a synaptic weight change amount, a derivative of a sign of a synaptic weight change, or an accumulated synaptic weight change, for a synapse between the first and second neuron models.

58. The computer program product of claim 46, further comprising instructions executable to determine a synaptic weight of a synapse between the first and second neuron models based on the uncertainty.

59. The computer program product of claim 46, further comprising instructions executable to use the delay to adjust an expected time of a pre-synaptic spike for the first neuron model relative to another expected time of another pre-synaptic spike for a third neuron model.

60. The computer program product of claim 46, wherein determining the delay comprises selecting a synapse with the delay from among a plurality of synapses with different delays.

* * * * *